//

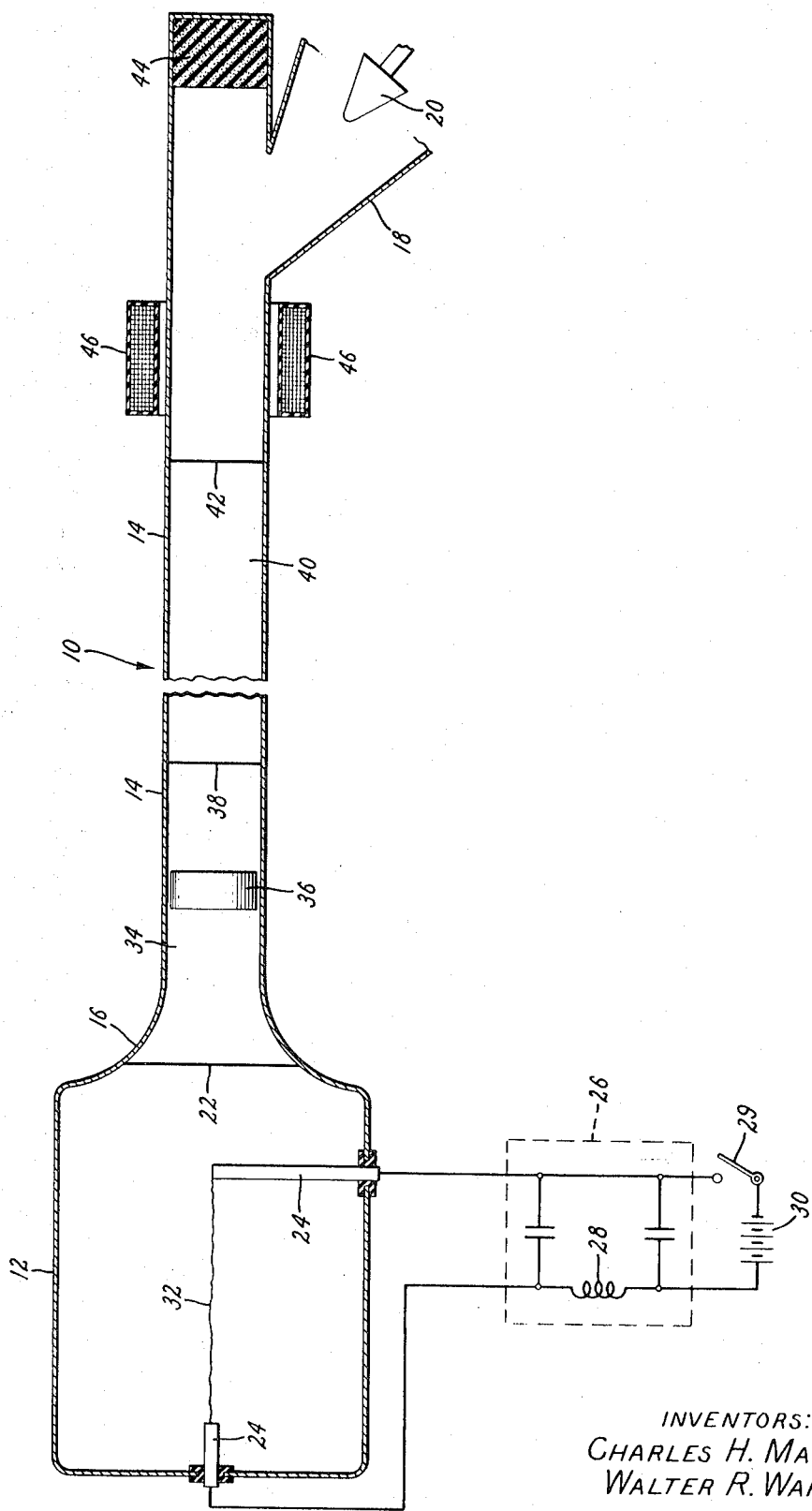

United States Patent Office 3,618,380
Patented Nov. 9, 1971

3,618,380
CONTINUOUS DISCHARGE DRIVER FREE-PISTON SHOCK TUNNEL
Charles H. Marston, Berwyn, and Walter R. Warren, Jr., Levittown, Pa., assignors to General Electric Company
Filed Nov. 5, 1968, Ser. No. 773,601
Int. Cl. G01n 9/00
U.S. Cl. 73—147
10 Claims

ABSTRACT OF THE DISCLOSURE

A continuous discharge, non-reflected shock tunnel capable of generating a short duration large scale, high velocity, high density gas flow. The apparatus consists of a gas filled driver chamber in which a high energy capacitor bank is discharged to raise the pressure in the driver, rupture a diaphragm and propel a piston down a connected smaller diameter tube thereby causing a shock wave to develop in front of the piston which compresses and accelerates a test gas within the tube. The capacitor discharge is maintained while the piston is moving to sustain a high gas pressure behind the piston so that it does not decelerate. The test gas then flows through an expansion nozzle to act upon a test body.

BACKGROUND OF THE INVENTION

The subject invention generally relates to the field of wind tunnels and, in particular, to non-reflected shock tunnels for generating a short duration, high velocity, high density air flow.

For the aerodynamic testing of bodies it is often desirable to have a shock tunnel capable of generating a high velocity, high density gas flow. Combustion driver/non-reflected shock tunnels have been developed but are severely limited in test time by the expansion wave which reflects from the end of a conventional driver and overtakes the shock wave and also by boundary layer development in the driven tube. Electric driver/reflected shock tunnels have also been developed but their performance is limited by the necessity to contain the test gas at stagnation pressure at the downstream end of the driven tube. In both types of facilities, losses lead to attenuation of the shock wave (decreasing shock Mach number) as the initial shock wave progresses within the driven tube.

SUMMARY OF THE INVENTION

It is an object of the subject invention to provide a shock tunnel of substantially higher performance than conventional shock tunnels within reasonable limitations of size and total energy input.

Another object of the present invention is to provide a non-reflected shock tunnel capable of generating a gas flow of a desired time duration.

An additional object of the subject invention is to provide a shock tunnel capable of generating a gas flow of substantially constant Mach number.

In order to fulfill the above-stated objects, the subject invention provides a non-reflected continuous discharge shock tunnel having an electro-pneumatic driver and a free piston acting at the interface between the driver gas and the test gas. A large bank of capacitors are discharged through an arc within a gas filled driver chamber. The resultant pressure increase breaks a diaphragm across a convergent nozzle and acts upon a free piston within a tube connected to the driver chamber. While the piston is moving and thereby causing the formation of a shock wave which compresses and accelerates a test gas in the tube, the capacitor discharge is maintained within the driver chamber so as to continue to add energy to the driver gas.

The subject matter which is regarded as the present invention is particularly pointed out and distinctly claimed in the concluding portion of the specification.

BRIEF DESCRIPTION OF THE DRAWING

The subject invention, however, together with further objects and advantages thereof, may best be understood by reference to the following description taken in connection with the accompanying drawing which is a side schematic view of a shock tunnel embodying the subject invention.

DESCRIPTION OF THE PREFERRED EMBODIMENT

In the drawing a schematic view of a non-reflected shock tunnel 10 for developing a test gas flow is shown. The shock tunnel includes a driver chamber 12 which is closed at one end and is connected to a relatively longer, driven tube 14 by a convergent nozzle 16 at the other end. The driver chamber is filled with a driver gas, such as helium, and has located therein at least one pair of electrodes 24 and a thin striker wire 32 which can be connected across the electrodes 24. The electrodes are electrically connected to an external capacitor bank 26 which preferably includes a plurality of capacitors connected in parallel with an inductance 28 connected in series with at least one of the capacitors to prolong the discharge of the capacitor for a purpose to be described in a succeeding paragraph.

Included within the tunnel are three rupturable diaphragms 22, 38 and 42 each having a predetermined burst strength. The first diaphragm 22 is located across the entrance to the converging nozzle 16 and serves to initially contain the driver gas in the driver chamber. It is preferably formed of a metal such as copper or steel and is designed to fully rupture without breaking apart when the gas in the driver chamber 12 reaches a predetermined pressure. The second and third diaphragms 38, 42 are located across the driven tube 14 downstream of convergent nozzle 16 and are preferably formed of a resinous film material such as polyethylene terephthalate. The portion 34 of the driven tube 14 between the first and second diaphragms 22, 38 is preferably evacuated, and has positioned therein a light-weight, free-moving piston 36 whose outside diameter is slightly smaller than the inside diameter of the tube 14.

The portion 40 of the tube between the second and third diaphragms contains the test gas, which is generally air. The driven tube 14 substantially terminates at a divergent nozzle 18 within which is located a test body 20, which is to be acted upon by the gas flow generated in the shock tunnel 10.

For operation of the shock tunnel 10 the capacitor bank 26 is charged by connecting it by means of a switch 29 to a suitable electrical power source 30. When discharge is desired across the electrodes 24, the striker wire 32 is connected to the ends of the electrodes 24. This completes the circuit and causes current to flow from the capacitors 26 across the electrodes 24 which vaporizes the striker wire 32. The arc generated by the capacitor discharge follows the path of the striker wire 32. The electric arc causes a localized heating of the gas which increases the pressure in the chamber 12. After the capacitor discharge has heated the gas causing a sufficient pressure to be reached, the diaphragm 22 bursts allowing the driver gas to flow through the converging nozzle 16 into the evacuated portion 34 of the driven tube 14.

The driver gas flowing through the evacuated portion 34 of the tube causes the piston 36 to translate rapidly down the tube 14 to break the second diaphragm 38.

As the piston 36 translates down the tube, the electric arc in the driver chamber 12 is maintained due to the inductance in the capacitor bank 26 so as to add energy to the driver gas and cause pressure waves to propogate downstream to the piston 36, thus preventing it from slowing down and causing the test gas to have a constant or increasing mach number during the test time. In this way the expansion wave limitation on test time capability of the tunnel is eliminated. A shock wave precedes the piston 36 into the test gas region 40. Behind the shock wave some of the shock heated and accelerated test gas is slowed as a boundary layer grows on the tube wall. By use of the piston 36, loss of this gas through the interface between the driver gas and the shock processed test gas is prevented. When the shock wave reaches the third diaphragm 42, it is ruptured and the test gas which has been heated and compressed by the shock wave preceding the piston accelerates through the divergent nozzle 18 past the body 20 which is to be tested. While the nozzle 18 may be aligned with the driven tube 14, preferably it is at a substantial angle to the driven tube 14 to allow a piston stop 44 to be located at the end of the tube 14 so at to catch the piston.

It is desirable that the piston be as light in weight as possible, while being strong enough to withstand the pressure and temperature to which it is subjected.

If desired, more energy may be added to the test gas flow by means of an MHD (magnetohydrodynamic) accelerator 46 located circumferentially about the tube 14 and before the divergent nozzle 18. Basically, an MHD accelerator, as is well known in the art, sets up a magnetic field in the fluid and causes an electric current to flow through the fluid so as to generate a force on the fluid tending to accelerate it. Also, a plurality of sets of electrodes and/or capacitor banks may be used, if desired.

It is possible to eliminate the second diaphragm 38 and not have a portion of the tube 14 evacuated. However, this is not generally desirable as it will subject the piston 36 to a higher shock force and will not allow it to accelerate as fast as it would in an evacuated portion of the tube.

Generally, a shock tunnel in accordance with the subject invention can develop a test flow having a velocity greater than or equal to 20,000 ft./sec. with a Mach number greater than 10 and the test flow being near free-stream equilibrium (less than 6% non-equilibrium gas species). The amount of testing time is in the order of one millisecond and the diameter of the test flow may be as large as eight feet. This is all achieved using a total input energy well within present existing capacity, i.e. less than or equal to 100 megajoules.

Some of the important parameters of the shock tunnel are the volume and cross-sectional area of the driver chamber 12, the length and length/diameter ratio of the driven tube 14 and the ratio of cross-sectional areas of the driver chamber 12 to the driven tube 14.

The critical time period, which is the time period past which constant pressure in the driver chamber 12 cannot be maintained regardless of the amount of energy added, is directly proportional to the volume of the driver chamber. This sets a lower limit for driver chamber volume because it is generally desirable that the critical time be at least 20 times the test time. From a practical standpoint, after 25–50% of the time period has elapsed, maintaining energy in the driver chamber has little beneficial effect on the operation of the shock tunnel. Therefore, the duration of the capacitor discharge arc is preferably about 25–50% of the critical time period or about 5–10 times the test time.

The total energy required for either a conventional or continuous discharge non-reflected shock tunnel is directly proportional to the driven tube volume because its cross-sectional area determines mass flow rate and its length is proportional to test time. However, a conventional non-reflected shock tunnel capable of comparable performance requires a driver about 30 feet long to sufficiently delay the arrival of the aforementioned expansion wave. This great length would require a capacitor bank initial voltage of 300 kv. Whereas, for a continuous discharge shock tunnel, driver chambers ranging from approximately nine inches in diameter and one foot in length to three inches by eight feet would satisfy the volume requirement and would be operable with an initial voltage of 60 kv. or less.

For proper performance of the continuous discharge driver it is desirable that the ratio of cross-sectional areas of the driver chamber 12 to the driven tube 14 be at least 3/1 and, in fact, a ratio of 10/1 is considered desirable.

In regard to fluid frictional effects at the walls of the driven tube, the larger the diameter of the tube the better. However, this is severely limited since the energy required is proportional to cross-sectional area of the tube.

The length of the driven tube is proportional to test time. It has been found that the mniimum length of the driven tube 14 should be about 100 feet and that the maximum ratio of length to diameter for the driven tube 14 should be about 700.

If it is desired, means other than a capacitor arc discharge may be provided for generating the necessary high energy discharge in the driver chamber such as one or a series of explosive charges of the proper energy and time duration.

Thus, the subject invention provides a non-reflected shock tunnel which is capable of higher performance at near equilibrium conditions—higher velocity, density, Mach number and/or Reynolds number—than conventional shock tunnels utilizing the same energy sources.

Many modifications may be made to the subject invention which are within the scope thereof. Therefore, the scope of the subject invention is to be construed only in regard to the appended claims.

What we desire to secure by Letters Patent of the United States is:

1. In a non-reflecting shock tunnel comprised of a gas-filled driver chamber, means for providing a high energy discharge within said driver chamber to raise the pressure above a given value, a driven tube at least a portion of which contains a test gas, a convergent nozzle connecting said driver chamber to said driven tube and means for containing the gas within said driven chamber when the gas pressure is below the given value; the improvement comprising:

a free piston having an outer diameter slightly less than the inner diameter of said tube, freely movable along the length of said tube and located in said tube near said convergent nozzle; and said means for providing a high energy discharge including means for sustaining said discharge for a predetermined length of time to control the flow of gas upstream of said piston and hence control the velocity of said piston.

2. Apparatus for generating a high velocity gas flow comprising:

(a) a gas-filled driver chamber;
   (b) means for providing a high energy discharge within said driver chamber;
   (c) a convergent nozzle at one end of said driver chamber;
   (d) a first diaphragm of preselected burst strength serving to initially contain the gas in said driver chamber;
   (e) a driven tube connected at one end to the smaller diameter end of said convergent nozzle;
   (f) a free piston having an outer diameter slightly less than the inner diameter of said tube, located within said tube near said convergent nozzle and freely movable along the length of said tube;
   (g) a second diaphragm of preselected burst strength located within said tube and serving to seal test gas within at least a portion of said tube; and (h) a gas outlet at the downstream end of said driven tube;

wherein said means for providing said high energy discharge includes means for sustaining said discharge for a predetermined length of time to control the flow of gas upstream of said piston and hence control the velocity of said piston; and wherein the length of said driven tube is substantially greater than the length of said driver chamber and the cross-sectional area of said driver chamber is substantially larger than the cross-sectional area of said driven tube.

3. Apparatus as in claim 2 further including a third diaphragm of preselected burst strength located within said tube between said first and second diaphragms; wherein the portion of said tube between said first and third diaphragms is evacuated; and said piston is located within said evacuated portion of said tube.

4. Apparatus as in claim 2 wherein said means for providing a high energy discharge includes capacitor discharge means comprising a bank of capacitors, an electric power supply for charging said capacitors; at least two electrodes located within the said discharge chamber and connected to said capacitors; and means for maintaining discharge of said capacitors for a predetermined length of time such that discharge of said capacitors causes a high energy arc to be developed across said electrodes thereby greatly increasing the pressure of the gas in said chamber.

5. Apparatus as in claim 4 wherein the ratio of cross-sectional areas of said driver chamber to said driven tube is at least 3/1.

6. Apparatus as in claim 4 wherein the ratio of the length to the diameter of said driven tube is no greater than 700/1.

7. Apparatus as in claim 6 wherein the length of said driven tube is at least 100 feet.

8. Apparatus as in claim 7 wherein said gas outlet is a divergent nozzle.

9. Apparatus as in claim 8 wherein said divergent nozzle is at a substantial angle to the axis of said driven tube and said driven tube further includes means for stopping the movement of said free piston.

10. Apparatus as in claim 4 further including an MHD accelerator located about said driven tube upstream of said gas outlet to add additional energy to the test gas.

References Cited
UNITED STATES PATENTS

| | | | |
|---|---|---|---|
| 2,836,063 | 5/1958 | Yoler et al. | 73—147 |
| 3,109,305 | 11/1963 | Kilmer et al. | 73—147 |
| 3,368,397 | 2/1968 | Wochna | 73—147 |

S. CLEMENT SWISHER, Primary Examiner